United States Patent
Von Beyer et al.

(10) Patent No.: US 12,151,403 B2
(45) Date of Patent: *Nov. 26, 2024

(54) METHOD FOR RECYCLING A TRANSFER PRODUCT

(71) Applicant: LEONHARD KURZ Stiftung & Co. KG, Fürth (DE)

(72) Inventors: Markus Von Beyer, Fürth (DE); Astrid Rauh, Nüremberg (DE); Siegfried Stengel, Wendelstein (DE); Martin Hahn, Herrieden (DE)

(73) Assignee: LEONHARD KURZ Stiftung & Co.KG, Fürth (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,699

(22) Filed: Jan. 31, 2023

(65) Prior Publication Data

US 2023/0173712 A1 Jun. 8, 2023

Related U.S. Application Data

(62) Division of application No. 17/432,393, filed as application No. PCT/EP2021/051115 on Jan. 20, 2021, now Pat. No. 11,597,119.

(30) Foreign Application Priority Data

Jan. 30, 2020 (DE) .......................... 102020102310.3

(51) Int. Cl.
*B29B 17/00* (2006.01)
*B29B 17/04* (2006.01)
*B29L 7/00* (2006.01)

(52) U.S. Cl.
CPC ...... *B29B 17/0036* (2013.01); *B29B 17/0412* (2013.01); *B29L 2007/00* (2013.01)

(58) Field of Classification Search
None
See application file for complete search history.

(56) References Cited

U.S. PATENT DOCUMENTS 11,597,119 B2 * 3/2023 Von Beyer ............... C08J 11/06
2005/0121817 A1 6/2005 Konig et al.
(Continued)

FOREIGN PATENT DOCUMENTS

CN 1890297 A 1/2007
CN 101151131 A 3/2008
(Continued)

OTHER PUBLICATIONS

Database WPI Week 200046 Thomson Scientific, London, GB; AN 2000-508059 XP002803087, JP 2000 177057 A (Tokuyama Corp) Jun. 27, 2000 (Jun. 27, 2000).

*Primary Examiner* — Robert J Grun
(74) *Attorney, Agent, or Firm* — Hoffmann & Baron, LLP

(57) ABSTRACT

A method for recycling a transfer product having at least one carrier film, wherein a transfer ply is arranged detachably at least partially on the at least one carrier film, and wherein the following steps are carried out in the method, in particular in the following order:
a) shredding (10) the transfer product, by means of a shredder or a shredding device, into transfer product shreds, in particular carrier film shreds, preferably wherein the transfer product is present wound onto a roll,
b) compressing (30) the transfer product shreds, in particular carrier film shreds, into a compact product or extruding (31) the transfer product shreds, in particular carrier film shreds, into an extrusion product.

37 Claims, 3 Drawing Sheets

(56) References Cited

U.S. PATENT DOCUMENTS

| | | |
|---|---|---|
| 2005/0154070 A1 | 7/2005 | Suzuki et al. |
| 2008/0191069 A1 | 8/2008 | Hofmann et al. |
| 2020/0023555 A1 | 1/2020 | Vidalat et al. |
| 2023/0202151 A1* | 6/2023 | Ortmann ................. B32B 27/06 428/336 |

FOREIGN PATENT DOCUMENTS

| | | |
|---|---|---|
| CN | 102658655 A | 9/2012 |
| CN | 102873787 A | 1/2013 |
| DE | 100 08 442 A1 | 8/2001 |
| DE | 10 2009 011 543 A1 | 9/2010 |
| EP | 2 226 181 A1 | 9/2010 |
| JP | 2000-177057 A | 6/2000 |
| JP | 2021-115862 A | 8/2021 |
| KR | 20100096722 A | 9/2010 |
| KR | 20120038093 A | 4/2012 |
| WO | 99/19857 A1 | 4/1999 |
| WO | 2007/076165 A2 | 7/2007 |
| WO | 2011/107476 A2 | 9/2011 |
| WO | 2014/184813 A1 | 11/2014 |

\* cited by examiner

METHOD FOR RECYCLING A TRANSFER PRODUCT

This application is a divisional of U.S. application Ser. No. 17/432,393, filed Aug. 19, 2021, which is a National Stage application based on an International Application filed under the Patent Cooperation Treaty, PCT/EP2021/051115, filed Jan. 20, 2021, which claims priority to DE 102020102310.3, filed Jan. 30, 2020.

BACKGROUND OF THE INVENTION

The invention relates to a method for recycling a transfer product.

It is known to use energy recovery for recycling stamping films. Conventional polyester carrier materials have a, comparatively, high calorific value of approx. 34,000 kJ/kg and are therefore predestined for the production of refuse-derived fuels. Even already used transfer products, consisting of carrier film and residual transfer ply, likewise have a high calorific value of approx. 21,000 kJ/kg. Such refuse-derived fuels or secondary fuels are primarily used in the cement industry, but also in power stations for energy generation. Fossil fuels such as coal and heavy fuel oil can be replaced by such fuels.

SUMMARY OF THE INVENTION

The object of the invention is now to specify an improved method for recycling a transfer product.

The object is achieved by a method for recycling a transfer product having at least one carrier film, wherein a transfer ply is arranged detachably at least partially on the at least one carrier film, and wherein the following steps are carried out in the method, in particular in the following order:
  a) shredding the transfer product, by means of a shredder or a shredding device, into transfer product shreds, in particular carrier film shreds, preferably wherein the transfer product is present wound onto a roll,
  b) compressing the transfer product shreds, in particular carrier film shreds, into a compact product or extruding the transfer product shreds, in particular carrier film shreds, into an extrusion product.

Through such a recycling method, at least one further life cycle of the carrier material is generated before it is utilized for energy. Further life cycles reduce the consumption of crude oil, which is needed to produce plastics. This conserves the environment and at the same time reduces $CO_2$ emissions. In addition, the advantage further results that the recycled carrier material can be used to produce new carrier film. It is also conceivable that the recycled plastic can also be used for the production of other plastic products, for example injection-molded parts and/or extrusion parts.

It is preferably provided that the transfer product is recycled both after a transfer process and/or laminating process and/or insert-molding process and/or in-mold decoration process and when produced as rejects. In the case where the transfer ply of the transfer product has been at least partially transferred to a substrate to be decorated, for example a component or a sheet material or roll material, the transfer product then has a carrier film with a residual transfer ply arranged thereon. The residual transfer ply describes the part of the transfer ply which has not been transferred to the substrate to be decorated and thus still remains on the carrier film. In the case of the rejects, the transfer ply remains completely on the carrier film. The proportion by weight of the transfer ply relative to the carrier film is preferably larger in the case of rejects than in the case of already transferred transfer ply. It is preferably provided that, with the method, the residual transfer ply, which is to be regarded essentially as foreign material, is removed from the carrier film, with the result that optimally the carrier material is recycled such that the resulting end product can be processed in further steps and has good material properties.

In particular, it is provided that the transfer product shreds comprise transfer ply constituents and/or carrier film shreds. Further, it is preferably possible for the transfer ply constituents to comprise varnish residues and/or varnish dusts and/or fine material. By fine material is meant particles which are coarser than dust particles, but smaller than transfer product shreds and/or carrier film shreds.

The at least one carrier film advantageously comprises a material or a combination of materials selected from: PET, PMMA, PC, PE, PVC, ABS, PU, PBS, TPU, PP, PLA, PEF and/or PAN.

The at least one carrier film preferably comprises PET as main constituent, wherein the proportion of PET in the carrier film is more than 97%, preferably more than 99.9%, particularly preferably more than 99.97%.

In order to improve the recyclability of the carrier film and also the material properties of the end product, it is preferably provided that the carrier material is present as pure as possible, i.e. that no other foreign substances and/or plastics which are different from the carrier material are present.

In a further embodiment, the at least one transfer ply, in particular the transfer ply constituents, has at least one layer or a combination of layers, selected from: adhesive layer, detachment layer, decorative layer, metal layer, adhesion-promoting layer, primer layer, color layer. It is possible for the named layers, in particular the decorative layer, preferably to be layers which contain metallic materials.

In particular, it is provided that the shredding device or the shredder in step a) comprises at least one device or combinations of devices, selected from: guillotine, shredder, cutting mill, hammer mill and/or mill.

Before step a) and after a transfer process and/or laminating process and/or insert-molding process and/or in-mold decoration process, the transfer product is preferably wound, in particular onto a film core, in the form of a roll. In a further embodiment, the transfer product is wound unmixed, in particular onto a film core. Alternatively, the winding in the form of a roll can also be effected without a film core, thus corelessly, and/or onto a film core which is removed from the film roll after the winding, with the result that the film roll is then present coreless. Such a removable film core can be for example part of a machine on which the transfer product is processed.

In an alternative embodiment, it is provided that the transfer product is collected, in particular unmixed, by means of collection vessels. The collected transfer product can be uncut or alternatively also cut and/or shredded and/or compressed and/or pressed.

By unmixed is meant that as far as possible only one transfer product is wound and/or collected on each roll. Good material properties of the end product or of the compact product and/or of the extrusion product are thus ensured.

In particular, it is provided that, before step a) and during the transfer process and/or laminating process and/or insert-molding process and/or in-mold decoration process, the transfer ply is at least partially transferred to a substrate to be decorated, wherein a transfer product is provided as a by-product. This is then preferably a transfer product with a residual transfer ply.

It is preferably provided that, before step a) and after the transfer process and/or laminating process and/or insert-molding process and/or in-mold decoration process, the transfer product is collected by means of collection vessels, in particular by means of a rack and/or container and/or transport box and/or banded bales.

Banded bales preferably denote pressed transfer products the volume of which is minimized by pressing. In order to hold the pressed transfer products together, it is preferably provided that they are wrapped in bands, with the result that a banded bale is provided.

In particular, the following step is further performed before step a):

winding the transfer product, in particular onto a film core, with the result that a roll is provided.

By film core is meant here a cardboard roll and/or a plastic roll and/or a machine part, onto which the transfer product is wound. The film core can either remain in the film roll or be removed from the film roll again after the film roll has been wound.

It is also preferably provided that the following step is further performed before step a):

collecting the transfer product by means of a collection vessel, in particular by means of a rack and/or container and/or transport box and/or banded bales.

Advantageously, the following step is preferably further performed before step a):

transporting the roll and/or the collection vessel to the shredder or the shredding device by hand and/or by means of a feeder.

The collecting or winding, in particular the unmixed collecting and/or winding, of the transfer product guarantees that the foreign material proportion is small. In particular, it is provided that, before step a), the transfer product has a foreign material proportion in the range of from 0 wt.-% to 5 wt.-%, preferably from 0 wt.-% to 1 wt.-% (wt.-%=percent by weight=proportion of the weight in percent of the total weight). Because the transfer products are sorted, in particular sorted in an unmixed way, before the actual recycling method, the downstream recycling process can be designed to be more efficient and the resultant compact products and/or extrusion products and/or plastic products have improved material properties.

Further, it is also preferably provided that, before step a), the transfer product has a proportion of adhesive strips and/or splicing tapes in the range of from 0 wt.-% to 0.5 wt.-%, preferably from 0 wt.-% to 0.1 wt.-%.

During the shredding of the transfer product in step a), it is provided in particular that the wound transfer product is cut into film webs, wherein the roll with the transfer product is fixed in a V-shaped depression, in particular is fixed horizontally, and is then cut open to the film core in the longitudinal direction by means of a blade, in particular from above or from below or from the side, and the film core is removed, in particular if there is a film core. Here, the roll is preferably cut open in such a way that the blade cuts perpendicularly to a tangent of the lateral surface in the direction of the film core. In particular in the case of cutting from above, the advantage results that the roll is fixed by the V-shaped depression and no further counter bearings are needed to absorb the cutting pressure of the blade. It is preferably provided that this method step is performed by means of a guillotine.

As mentioned at the start, the film core preferably consists of a different material from the transfer product, which is why it is preferably provided that this film core, which acts as foreign material, is removed.

It is preferably also possible for the shredder and/or shredding device to cut and/or chop and/or shred and/or tear the transfer product in step a).

In a possible embodiment, it is provided that, in step a), during the shredding of the transfer product, the at least one transfer ply is at least partially removed from the at least one carrier film, and thus a mixture of transfer product shreds and/or carrier film shreds and/or transfer ply constituents results.

It is possible for transfer product shreds which have both a carrier film and at least one transfer ply to result. In particular, the aim is to release as many transfer ply constituents from the carrier film as possible after several method steps, with the result that optimally pure carrier film shreds result. Carrier film shreds preferably denote shreds in which the transfer ply is completely removed and which consist of the carrier material alone and/or in a high proportion, preferably more than 97%, preferably more than 99.9%, particularly preferably more than 99.97%.

In particular, it is provided that the transfer product shreds after step a) have a varnish residue proportion in the range of from 0 wt.-% to 100 wt.-%, preferably from 10% to 100 wt.-%, particularly preferably from 50 wt.-% to 100 wt.-%. It is also possible for varnish residues to comprise varnish dusts.

The transfer product shreds after step a) advantageously have a fine material proportion in the range of from 0 wt.-% to 20 wt.-%, preferably from 0 wt.-% to 5 wt.-%.

In particular, it is provided that the varnish residue proportion and/or the fine material proportion is reduced successively from method step to method step.

It is preferably provided that the transfer product shreds, in particular carrier film shreds, after step a) have a mass in the range of from 0.01 mg to 100 mg, preferably from 0.5 mg to 10 mg, particularly preferably from 1 mg to 5 mg. The mass of the transfer product shreds is important in particular for the removal of the transfer ply constituents in step c) by means of mechanical cleaning by machine and/or important for as complete as possible a drying of the transfer product shreds in step e) by means of a mechanical dryer.

In an embodiment, it is provided that the following step is further performed after step a), in particular before step b):

c) mechanically cleaning the transfer product shreds, in particular carrier film shreds, by machine, in particular without washing liquid, in order to remove foreign materials and/or transfer ply constituents.

In particular, it is possible for the following step to be further performed after step a), in particular before step c) or step b):

transporting the transfer product shreds, in particular carrier film shreds, by means of a feeder and/or by means of at least one transport container, in particular collection vessel and/or rack and/or container and/or transport box and/or banded bales and/or big bag, wherein the at least one transport container is filled, in particular before step c) or step b), with the transfer product shreds.

By big bag is meant a flexible bulk container, which preferably consists of plastic. The big bag preferably has handles and/or loops, with the result that the big bag can be transported or loaded by means of a crane and/or forklift truck.

The mechanical cleaning by machine in step c) is advantageously effected by means of friction, wherein the transfer product shreds are present in the dry state and further transfer ply constituents are removed.

Further, it is preferably possible for the transfer product shreds after step c) to have a varnish residue proportion in the range of from 0 wt.-% to 100 wt.-%, preferably from 10 wt.-% to 100 wt.-%, particularly preferably from 50 wt.-% to 100 wt.-%.

In particular, the following step is further performed before step b), and in particular after step c):

transporting the transfer product shreds, in particular carrier film shreds, by means of a feeder and/or by means of at least one transport container, in particular collection vessel and/or rack and/or container and/or transport box and/or banded bales and/or big bag, wherein the at least one transport container is filled, in particular before step b), with the transfer product shreds.

In an embodiment variant, it is preferably provided that, in step b), the compressing (30) is effected by means of agglomerating, in particular by means of a plastics compactor or by means of a pellet press.

It is preferably possible, during the compressing in step b), for the transfer product shreds, in particular carrier film shreds, to be compacted and/or compressed in order to provide a compact product with a higher bulk density, in particular wherein the bulk density of the compact product has a bulk density higher by a factor of 1 to 20, preferably by a factor of 5 to 20, than the bulk density of the transfer product shreds, in particular carrier film shreds.

The bulk density indicates the ratio of the mass of a bulk material to its bulk volume. The space requirement for storing the compact product can be reduced through a higher bulk density. This also has a positive effect on the transport, as a larger mass can be transported with a constant volume. Further, the bulk density also has an influence on the process parameters of shaping processes, such as for example the injection molding and/or the extrusion.

It is also provided that the following step is further performed before the extruding in step b):

shredding and/or mixing and/or heating and/or drying and/or degassing and/or compressing and/or buffering the transfer product shreds, in particular carrier film shreds, in a cutter compactor, in particular in order to increase the bulk density.

In particular during the degassing, for example, foreign substances can be removed, which are then filtered out through a filter system.

It is advantageously provided that, during the extruding in step b), the transfer product shreds, in particular carrier film shreds, are plasticized and homogenized by means of an extruder system, in particular in order to produce an extrusion product and/or granular material. It is in particular provided that the transfer product shreds are heated up to their melting temperature by means of heat input and are then compressed by means of the extruder system, with the result that a uniform molten plastic is provided.

By extruder system is meant here in particular a single screw extruder, a co-rotating or counter-rotating twin screw extruder, a ring extruder, a planetary roller extruder, a multi-rotation system, a plasticator or another extruder system.

It is advantageously provided that during the compressing in step b) the transfer product shreds, in particular carrier film shreds, are plasticized by means of an extruder system, in particular in order to produce a compact product, which consists of compacted transfer product shreds.

It is advantageously also provided that the following step is further performed after the compressing or extruding in step b):

Liquid State Polymerization and/or Solid State Polymerization to improve the material properties, in particular to increase the molecular weight and/or to increase the viscosity.

It is preferably possible for the melting temperature of the transfer product shreds, in particular carrier film shreds, in step b) during the extruding to be in a range of from 100° C. to 350° C., in particular from 150° C. to 320° C., preferably from 260° C. to 290° C.

It is preferably possible, in step b), for the melting temperature during the extrusion of the transfer product shreds, in particular carrier film shreds, in particular if the carrier film comprises PET as main constituent, to be in a range of from 150° C. to 320° C., preferably from 260° C. to 290° C.

It is preferably possible, in step b), for the temperature during the compressing of the transfer product shreds, in particular carrier film shreds, to be in a range of from 25° C. to 150° C., preferably from 40° C. to 120° C.

In particular, it is provided that, in step b), a vacuum and/or a negative pressure which is preferably in a range of from 0.01 mbar to 1,013 mbar is generated in the extruder system.

The compact product and/or extrusion product advantageously has a purity after step b) in the range of from 60.0 wt.-% to 100.0 wt.-%, preferably from 95.0 wt.-% to 100.0 wt.-%, particularly preferably from 99.0 wt.-% to 100.0 wt.-%. As already mentioned further above, the purity is advantageously improved successively from step to step. The specification of the purity preferably relates to the proportion by mass of the carrier material.

In particular, it is provided that after step b) the compact product and/or extrusion product has an intrinsic viscosity in the range of from 0.3 dl/g to 0.9 dl/g, preferably from 0.5 dl/g to 0.7 dl/g.

It is preferably also possible, after step b), for the compact product and/or extrusion product to be colorless, transparent, crystal clear, opaque, dyed, at least partially dyed or colored. In particular in the case of a colorless and/or transparent and/or crystal clear compact product and/or extrusion product, there is the advantage that it can afterwards be dyed as desired.

The compact product and/or extrusion product after step b) is advantageously formed cylindrical and has a cylinder diameter in the range of from 0.1 mm to 20 mm, preferably from 3 mm to 10 mm, particularly preferably from 4 mm to 6 mm, and a cylinder height in the range of from 0.1 mm to 20 mm, preferably from 3 mm to 10 mm, particularly preferably from 4 mm to 6 mm. The compact product and/or extrusion product after step b) can preferably also be spherical and have a diameter in the range of from 0.1 mm to 20 mm, preferably in the range of from 3 mm to 10 mm, particularly preferably in the range of from 4 mm to 6 mm.

In particular, it is possible, after step b), for the compact product and/or extrusion product to be suitable for at least one subsequent process or a combination of processes, selected from: injection molding, extrusion, pressing processes, compounding, chemical recycling and/or energy recovery.

It is preferably provided that the following step is further performed before step d):

transporting the transfer product shreds, in particular carrier film shreds, by means of a feeder and/or by means of at least one transport container, in particular collection vessel and/or rack and/or container and/or transport box and/or banded bales and/or big bag, wherein the at least one transport container is filled, in particular before step d), with the transfer product shreds.

It is advantageously also possible for the following step to be further performed after step c):

d) cleaning the transfer product shreds with washing liquid by means of at least one cleaning device or a combination of cleaning devices, selected from: washer, hot washer, friction washer, wet cutting device, and/or wet cutting mill, preferably wherein at least one washing liquid or a combination of washing liquids and/or washing substances selected from: water, washing solution, solvent, surfactants, additives, lye/acid, abrasive additives or combinations thereof is used, with the result that the at least one transfer ply is at least partially removed from the carrier film and further transfer ply constituents result.

In the case of transfer layers that are difficult to detach, such as for example adhesive layers and/or color layers and/or special varnish layers and/or metal layers and/or decorative layers, a mechanical cleaning by machine may possibly not be sufficient to detach the transfer ply from the carrier film. During the cleaning, in particular with washing liquid, the chemical and/or physical bonds between the transfer ply, in particular transfer layers, and the carrier film are advantageously at least partially broken, which promotes the removal of the transfer plies.

Further, it is provided in particular that in step d) the at least one transfer ply is removed from the carrier film by means of friction. By friction is meant here in particular rubbing, which takes effect between the transfer product shreds and the washing liquid and/or a wall or a sieve of the cleaning device. It is preferably provided that the rubbing forces taking effect are greater than the adhesive forces of the detachment layer, which is preferably arranged between carrier film and transfer ply.

It is also possible in particular, in step d), for the proportion of transfer product shreds in the washing liquid to be in a range of from 0.1 wt.-% to 25 wt.-%, preferably from 1 wt.-% to 10 wt.-%.

It is advantageously provided that, in step d), the further transfer ply constituents are removed from the washing liquid by means of at least one thermal and/or mechanical separating process, in particular filtration and/or distillation. This method step preferably takes place close in time to the washing process, in order that the sometimes very small transfer ply constituents, in particular further transfer ply constituents, can be prevented from dissolving and/or dispersing in the washing liquid. As a result, transfer product shreds, in particular carrier film shreds, that are as pure as possible are preferably obtained, i.e. the foreign material proportion or the proportion of the transfer ply constituents relative to the carrier material is as small as possible. In particular, it is provided that after step d) the transfer product shreds have a purity in the range of from 60.0 wt.-% to 100.0 wt.-%, preferably from 95.0 wt.-% to 100.0 wt.-%, particularly preferably from 99.0 wt.-% to 100.0 wt.-%. As also already mentioned further above, the purity of the transfer product shreds is improved successively from step to step.

Further, it is preferably provided that after step d) the transfer product shreds are colorless, transparent, crystal clear, opaque, dyed, at least partially dyed or colored.

It is in particular provided that the transfer product shreds, in particular carrier film shreds, after step d) have a residual moisture, wherein among other things constituents of the washing liquid also adhere to the transfer product shreds, in particular carrier film shreds. The residual moisture and also the constituents of the washing liquid need to be removed before the further processing, in particular compressing and/or extruding and/or compounding. For this purpose, a drying step is advantageously effected after the cleaning with washing liquid in step d). It is provided in particular that the following step is further performed before step e):

transporting the transfer product shreds, in particular carrier film shreds, by means of a feeder and/or by means of at least one transport container, in particular collection vessel and/or rack and/or container and/or transport box and/or banded bales and/or big bag, wherein the at least one transport container is filled, in particular before step e), with the transfer product shreds.

Further, it is preferably possible for the following step to be further performed after step d):

e) drying the transfer product shreds, by means of a mechanical dryer and/or thermal dryer, in particular in order to reduce the moisture of the transfer product shreds.

It is preferably possible, in step e), for the thermal dryer to have a temperature in the range of from 10° C. to 120° C., preferably from 40° C. to 80° C.

In particular, it is provided that after step e) the transfer product shreds have a moisture in the range of from 0% to 25%, preferably from 0% to 5%.

Preferably, after step e), the transfer product shreds have a purity in the range of from 60.0 wt.-% to 100.0 wt.-%, preferably from 95.0 wt.-% to 100.0 wt.-%, particularly preferably from 99.0 wt.-% to 100.0 wt.-%. As already described previously, the degree of purity is improved successively from step to step.

It is further preferably provided that after step e) the transfer product shreds are colorless, transparent, crystal clear, opaque, dyed, at least partially dyed or colored.

It is preferably provided that the following step is further performed before step f), in particular after step b):

transporting the compact product and/or the extrusion product and/or the transfer product shreds, in particular carrier film shreds, by means of a feeder and/or by means of at least one transport container, in particular collection vessel and/or rack and/or container and/or transport box and/or banded bales and/or big bag, wherein the at least one transport container is filled, in particular before step f), with the compact product and/or the extrusion product and/or the transfer product shreds.

In particular, it is provided that the following step is further performed after step a) or after step b):

f) compounding the compact product and/or the extrusion product, wherein additives are added in order to provide a compound with improved material properties.

It is preferably provided that after the compounding a compound is provided as molten material and/or as granular material.

It is advantageously possible, in step f), for the transfer product shreds and/or the compact product and/or extrusion product together with the additives to be conveyed and/or plasticized and/or homogenized in a compounder, in particular an extruder system, for example a single screw extruder, a co-rotating or counter-rotating twin screw extruder, a ring extruder, a planetary roller extruder, a multi-rotation system, a plasticator and/or another extruder system.

In step f), the molten compound is advantageously further processed directly in a shaping process, in particular an injection-molding process and/or pressing process and/or extrusion process. This has the advantage that the compound does not have to be further processed into a granular material first, before it is ultimately finally processed into a molded plastic part and/or extrusion product in further processing processes, preferably in an injection-molding process and/or pressing process and/or extrusion process. Transport and storage are thus dispensed with. Further, the advantage results that the energy consumption can be lowered, as the compound is already present in the molten state and thus no longer needs to be additionally melted and/or plasticized and/or homogenized for the injection-molding process and/or pressing process and/or extrusion process.

It is preferably provided that, in step f), when the shaping process is being carried out, the melting temperature for the compound is in a range of from 100° C. to 350° C., in particular from 150° C. to 320° C., preferably from 260° C. to 290° C.

It is preferably provided that, in step f), when the shaping process is being carried out, the melting temperature for the compound, in particular if the carrier film comprises PET as main constituent, is in a range of from 150° C. to 320° C., preferably from 260° C. to 290° C.

In particular, it is also provided that, in step f), the molten compound is further processed into a granular material by means of strand granulation and/or underwater granulation. After this method step a high-quality granular plastic material with good material properties is advantageously obtained, which can subsequently be used as raw material in an injection-molding process and/or pressing process and/or extrusion process.

It is preferably also provided that, in step f), during the compounding, the melting temperature is in a range of from 100° C. to 350° C., in particular from 150° C. to 320° C., preferably from 260° C. to 290° C.

It is preferably also provided that, in step f), during the compounding, the melting temperature, in particular if the carrier film comprises PET as main constituent, is in a range of from 150° C. to 320° C., preferably from 260° C. to 290° C.

Further, it is also preferably provided that, in step f), during the compounding, a vacuum and/or negative pressure which is preferably in a range of from 0.01 mbar to 1,013 mbar is generated in the compounder, in particular extruder system.

The compound and/or granular material, after step f), in particular in the case of PET as main constituent, advantageously has a notch toughness, in particular measured according to Charpy at room temperature, in the range of from 1 kJ/m$^2$ to 100 kJ/m$^2$, preferably from 5 kJ/m$^2$ to 60 kJ/m$^2$.

Further, it is preferably provided that after step f) the compound and/or granular material, in particular in the case of PET as main constituent, has a modulus of elasticity (E modulus), in particular determined at room temperature by means of a tensile test, in the range of from 1,000 MPa to 10,000 MPa, preferably from 1,300 MPa to 8,000 MPa.

It is possible in particular, after step f), for the compound and/or granular material to have a purity in the range of from 20.0 wt.-% to 99.9 wt.-%, preferably from 50 wt.-% to 99.9 wt.-%, particularly preferably from 80 wt.-% to 99.9 wt.-%.

The method according to the invention is suitable in particular for recycling transfer products the transfer plies of which consist of different materials from the carrier film. Such a method offers the advantage that used transfer products are not thrown away, but are reprocessed, with the result that further life cycles result. This offers substantial economic and ecological advantages, as the production of new plastics can be dispensed with. Through the successive removal of the transfer ply, plastic material that is as pure as possible is obtained, which can be used to produce new carrier film and/or other plastic components.

BRIEF DESCRIPTION OF THE DRAWINGS

Further embodiments of the invention are represented in the figures and described below. There are shown in.

DETAILED DESCRIPTION

In the following, the invention is explained by way of example with reference to several embodiment examples utilizing the attached drawings. The embodiment examples shown are therefore not to be understood as limitative.

Figure 1:
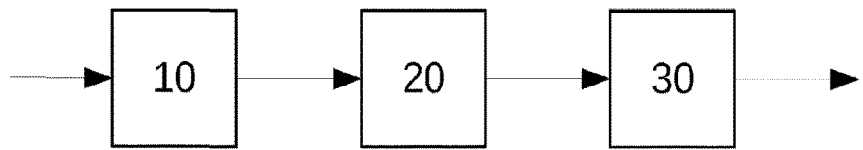
FIG. 1: a schematic representation of a process of recycling a transfer product

FIG. 1 shows an example of a method for recycling a transfer product having at least one carrier film, wherein a transfer ply is arranged detachably at least partially on the at least one carrier film, and wherein the following steps are carried out in the method:

a) shredding 10 the transfer product, by means of a shredder or a shredding device, into transfer product shreds, in particular carrier film shreds, preferably wherein the transfer product is present wound onto a roll, b) compressing 30 the transfer product shreds, in particular carrier film shreds, into a compact product.

It is preferably also provided that an extrusion 31 of the transfer product shreds, in particular carrier film shreds, into an extrusion product is effected in step b).

It is preferred that, before the shredding 10, in particular before step a), after a transfer process and/or laminating process and/or insert-molding process and/or in-mold decoration process, the transfer product is wound, in particular onto a film core, in the form of a roll. In particular, it is also provided that, before the shredding 10, in particular before step a), and after the transfer process and/or laminating process and/or insert-molding process and/or in-mold decoration process, the transfer product is collected by means of collection vessels, in particular by means of a rack and/or container and/or transport box and/or banded bales.

In a further embodiment, it is provided that the transfer product is wound unmixed, in particular onto a film core, in the form of a roll. Alternatively, the winding in the form of a roll can also be done without a film core, thus corelessly, and/or effected onto a film core which is removed from the film roll after the winding, with the result that the film roll is then present coreless. Such a removable film core can be for example part of a machine on which the transfer product is processed.

It is also provided that the transfer product can be collected unmixed. Unmixed means that only transfer products which are of the same and/or similar nature, for example have the same carrier material, are wound or collected on the roll. It is thus ensured that no further foreign bodies and/or foreign materials flow into the recycling process. This additionally increases the quality and improves the material properties of the end product and/or compact product and/or extrusion product.

It is also provided that, before the shredding 10, during the transfer process and/or laminating process and/or insert-molding process and/or in-mold decoration process, the transfer ply is at least partially transferred to a substrate to be decorated, and wherein a transfer product is provided as a by-product.

In particular, the following step is further performed before the shredding 10: winding the transfer product, in particular onto a film core, with the result that a roll is provided. In particular, this method step is performed after the production of rejects. Rejects denotes transfer products in the production of which errors have occurred, for example a layer of the transfer ply may not have been deposited with sufficient quality. Such rejects are not provided for sale to customers. In order to keep the resulting damage as small as possible, the transfer product declared to be a reject is recycled, in order that the materials can be re-used.

Further, it is preferably provided that the following step is further performed before the shredding 10, in particular in step a):

transporting the roll to the shredder or the shredding device by hand and/or by means of a feeder.

It can also be provided that during the shredding 10 of the transfer product, in particular in step a), the wound transfer product is cut into film webs, wherein the roll with the transfer product is fixed in a V-shaped depression, in particular is fixed horizontally, and is then cut open to the film core in the longitudinal direction by means of a blade, in particular from above or from below or from the side, and the film core is removed, in particular if there is a film core. This has the advantage that the transfer product is easily detached from the film core quickly and can be used for further processing.

In particular, it is possible for the shredder and/or the shredding device to cut and/or chop and/or shred and/or tear the transfer product during the shredding 10, in particular in step a).

It is further preferably provided that, during the shredding 10 of the transfer product, in particular in step a), the at least one transfer ply is at least partially removed from the at least one carrier film, and thus a mixture of transfer product shreds and/or carrier film shreds and/or transfer ply constituents results.

Advantageously, the transfer product shreds after the shredding 10, in particular in step a), have a varnish residue proportion in the range of from 0 wt.-% to 100 wt.-%, preferably from 10% to 100 wt.-%, particularly preferably from 50 wt.-% to 100 wt.-%.

It is advantageously provided that the transfer product shreds after the shredding 10, in particular in step a), have a fine material proportion in the range of from 0 wt.-% to 20 wt.-%, preferably from 0 wt.-% to 5 wt.-%.

It is also preferably possible for the transfer product shreds, in particular carrier film shreds, after the shredding 10, in particular in step a), to have a mass in the range of from 0.01 mg to 100 mg, preferably from 0.5 mg to 10 mg, particularly preferably from 1 mg to 5 mg.

In the embodiment shown in FIG. 1, it is preferably provided that the following step is further performed after the shredding 10:

mechanically cleaning 20 the transfer product shreds, in particular carrier film shreds, by machine, in particular without washing liquid, in order to remove foreign materials and/or transfer ply constituents.

In a possible embodiment, the shredding device and/or the shredder are arranged separate from the mechanical cleaning 20 by machine, which is why a transport between the two process stations is necessary. In particular, it is provided that the following step is further performed after the shredding 10, in particular in step a), and before the mechanical cleaning 20 by machine, in particular in step c):

transporting the transfer product shreds, in particular carrier film shreds, by means of a feeder and/or by means of at least one transport container, in particular collection vessel and/or rack and/or container and/or transport box and/or banded bales and/or big bag, wherein the at least one transport container is filled, before the mechanical cleaning 20 by machine, in particular in step c), with the transfer product shreds.

By feeder is meant any transport vehicles and/or conveyor belts and/or pneumatic conveyors or the like.

During the mechanical cleaning 20 of the transfer product shreds by machine, in particular in step c), preferably by means of a mechanical drying, foreign materials and/or transfer ply constituents are advantageously removed. The mechanical cleaning 20 by machine is preferably effected after the shredding 10, in order to separate the transfer ply constituents resulting during the shredding, in particular residues of the transfer ply, such as for example varnish residues, varnish dusts and/or fine material, from the transfer product shreds.

In particular, it is provided that the mechanical cleaning 20 by machine, in particular in step c), is effected by means of friction, wherein the transfer product shreds are present in the dry state and further transfer ply constituents are removed.

The transfer product shreds after the mechanical cleaning 20 by machine, in particular after step c), advantageously have a varnish residue proportion in the range of from 0 wt.-% to 100 wt.-%, preferably from 10 wt.-% to 100 wt.-%, particularly preferably from 50 wt.-% to 100 wt.-%.

It is preferably possible for the following step to be further performed before the compressing 30, in particular before step b), and in particular after the mechanical cleaning 20 by machine, in particular after step c):

transporting the transfer product shreds, in particular carrier film shreds, by means of a feeder and/or by means of at least one transport container, in particular collection vessel and/or rack and/or container and/or transport box and/or banded bales and/or big bag, wherein the at least one transport container is filled, in particular before the compressing 30, with the transfer product shreds.

Further, it is provided in particular that, during the compressing 30, in particular in step b), the transfer product shreds, in particular carrier film shreds, are compacted and/or compressed in order to provide a compact product with a higher bulk density, in particular wherein the bulk density of the compact product has a bulk density higher by a factor of 1 to 20, preferably by a factor of 5 to 20, than the bulk density of the transfer product shreds, in particular carrier film shreds.

Figure 2:
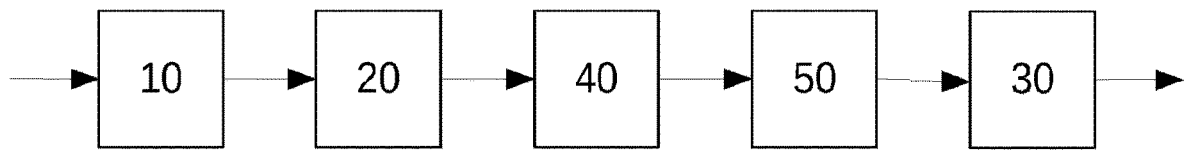
FIG. 2: a schematic representation of a process of recycling a transfer product

A further method for recycling a transfer product is represented in FIG. 2. This method includes the steps presented in FIG. 1 of shredding 10, mechanical cleaning 20 by machine and compressing 30, wherein a cleaning 40 with washing liquid and a drying 50 take place after the mechanical cleaning 20 by machine and before the compressing 30. In particular, it is provided in this embodiment variant that the following step is further performed after the mechanical cleaning 20 by machine, in particular after step c):

cleaning 40 the transfer product shreds with washing liquid by means of at least one cleaning device or a combination of cleaning devices, selected from: washer, hot washer, friction washer, wet cutting device, and/or wet cutting mill, preferably wherein at least one washing liquid or a combination of washing liquids and/or washing substances selected from: water, washing solution, solvent, surfactants, additives, lye/acid, abrasive additives or combinations thereof is used, with the result that the at least one transfer ply is at least partially removed from the carrier film and further transfer ply constituents result.

In the case of transfer layers that are difficult to detach, such as for example adhesive layers and/or color layers and/or special varnish layers and/or metal layers and/or decorative layers, a mechanical cleaning 20 by machine may possibly not be sufficient to detach them from the carrier film. During the cleaning 40 with washing liquid, the chemical and/or physical bonds between transfer ply, in particular transfer layers, and carrier film can be at least partially broken, which promotes the removal of the transfer plies.

During the cleaning 40 with washing liquid, it is provided in particular that the at least one transfer ply is removed from the carrier film by means of friction. After the removal of the transfer ply, the further varnish residues and/or the further varnish dust and/or the further fine material for the present remain in the washing liquid. In order to guarantee a high degree of purity for the subsequent method steps, it is provided that during the cleaning 40 with washing liquid, in particular in step d), the further transfer ply constituents are removed from the washing liquid by means of at least one thermal and/or mechanical separating method, in particular filtration and/or distillation.

In order to promote the removal of the transfer ply from the carrier film, it has proved worthwhile in particular for the proportion of transfer product shreds in the washing liquid during the cleaning 40 with washing liquid in step d) to be in a range of from 0.1 wt.-% to 25 wt.-%, preferably from 1 wt.-% to 10 wt.-%.

It is also preferably provided that, after the removal of the transfer ply constituents, the latter only stay in the washing liquid for a short time, in order that they do not dissolve and/or disperse in the washing liquid.

It is preferably provided that after the cleaning 40 with washing liquid, in particular after step d), the transfer product shreds have a purity in the range of from 60.0 wt.-% to 100.0 wt.-%, preferably from 95.0 wt.-% to 100.0 wt.-%, particularly preferably from 99.0 wt.-% to 100.0 wt.-%.

In particular in order to reduce the moisture of the transfer product shreds after the cleaning 40 with washing liquid, in particular after step d), it is preferably provided to perform the following step:

drying 50 the transfer product shreds by means of a mechanical dryer and/or thermal dryer.

Advantageously, it is possible for the transfer product shreds after the drying 50, in particular after step e), to have a moisture in the range of from 0% to 25%, preferably from 0% to 5%. Through the drying 50, it is guaranteed that no further substances which are contained in the washing liquid also flow into the subsequent method step.

In addition to the following method step of compressing 30 shown in FIG. 2, it is preferably also possible for an extruding 31 to be performed. In particular during the compressing 30 and/or extruding 31, it is of particular importance that the transfer product shreds to be compressed and/or to be extruded have a high degree of purity. In general it is true that the purer the material to be compressed and/or extruded is, the better the material properties of the compact product and/or extrusion product are after the compressing 30 and/or extruding 31. By material properties is meant properties and physical and chemical properties, for example the density, the melting temperature, the strength, the notch toughness, the modulus of elasticity, the shear modulus and/or the viscosity. Therefore, it is provided in particular that after the drying 50, in particular in step e), the transfer product shreds have a purity in the range of from 60.0 wt.-% to 100.0 wt.-%, preferably from 95.0 wt.-% to 100.0 wt.-%, particularly preferably from 99.0 wt.-% to 100.0 wt.-%.

Figure 3:
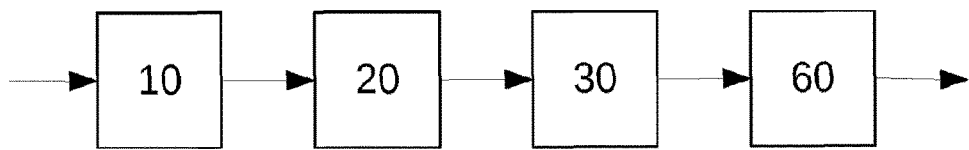
FIG. 3: a schematic representation of a process of recycling a transfer product

A further schematic representation of a process for recycling a transfer product is represented in FIG. 3. This recycling process likewise comprises the steps of shredding 10, mechanically cleaning 20 by machine and compressing 30 already presented in FIG. 1 and FIG. 2. Instead of the compressing 30, an extruding 31 can also be effected. However, a compounding 60 also takes place after the compressing 30 or extruding 31. In an alternative embodiment, it can also be provided that the compounding 60 is effected after the shredding 10, with the result that the transfer product shreds are preferably compounded directly after the shredding 10. It is preferably provided that a compact product and/or extrusion product and/or transfer product shreds is/are compounded, wherein additives are added in order to provide a compound with improved material properties. This is necessary in particular when a transfer product which has a high proportion of transfer ply is present at the beginning. In particular, this is the case during the production of rejects in the process for producing the transfer product. In the case of such rejects, the carrier film of the transfer product is preferably almost completely covered with a transfer ply. If this is the case, the danger exists in particular that proportions of the transfer ply cannot be sufficiently removed with the presented method steps of shredding 10 and mechanically cleaning 20 by machine. The transfer product shreds are thus compressed with a high proportion of transfer ply, which is deemed to be foreign material. Due to the high foreign material proportion, the plastic is not pure and therefore does not have optimal material properties. In particular through the addition of additives during the compounding 60, the material properties can be improved, with the result that the plastic is suitable for further processing, for example injection molding and/or pressing and/or extrusion.

In particular, it is provided that during the compounding 60, preferably in step f), the compact product and/or extrusion product and/or transfer product shreds together with the additives are conveyed and/or plasticized and/or homogenized in a compounder, in particular an extruder system, for example a single screw extruder, a co-rotating or counter-rotating twin screw extruder, a ring extruder, a planetary roller extruder, a multi-rotation system, a plasticator and/or another extruder system.

The compound and/or granular material after the compounding 60, in particular in step f), in particular if the carrier film comprises PET as main constituent, preferably has a notch toughness, in particular measured according to Charpy at room temperature, in the range of from 1 kJ/m² to 100 kJ/m², preferably from 5 kJ/m² to 60 kJ/m².

Further preferably, the compound and/or granular material after the compounding 60, in particular in step f), in particular if the carrier film comprises PET as main constituent, has a modulus of elasticity (E modulus), in particular determined at room temperature by means of a tensile test, in the range of from 1,000 MPa to 10,000 MPa, preferably from 1,300 MPa to 8,000 MPa.

It is preferably also provided that the compound and/or granular material after the compounding 60, in particular after step f), has a purity in the range of from 20.0 wt.-% to 99.9 wt.-%, preferably from 50.0 wt.-% to 99.9 wt.-%, particularly preferably from 80.0 wt.-% to 99.9 wt.-%.

Figure 4:
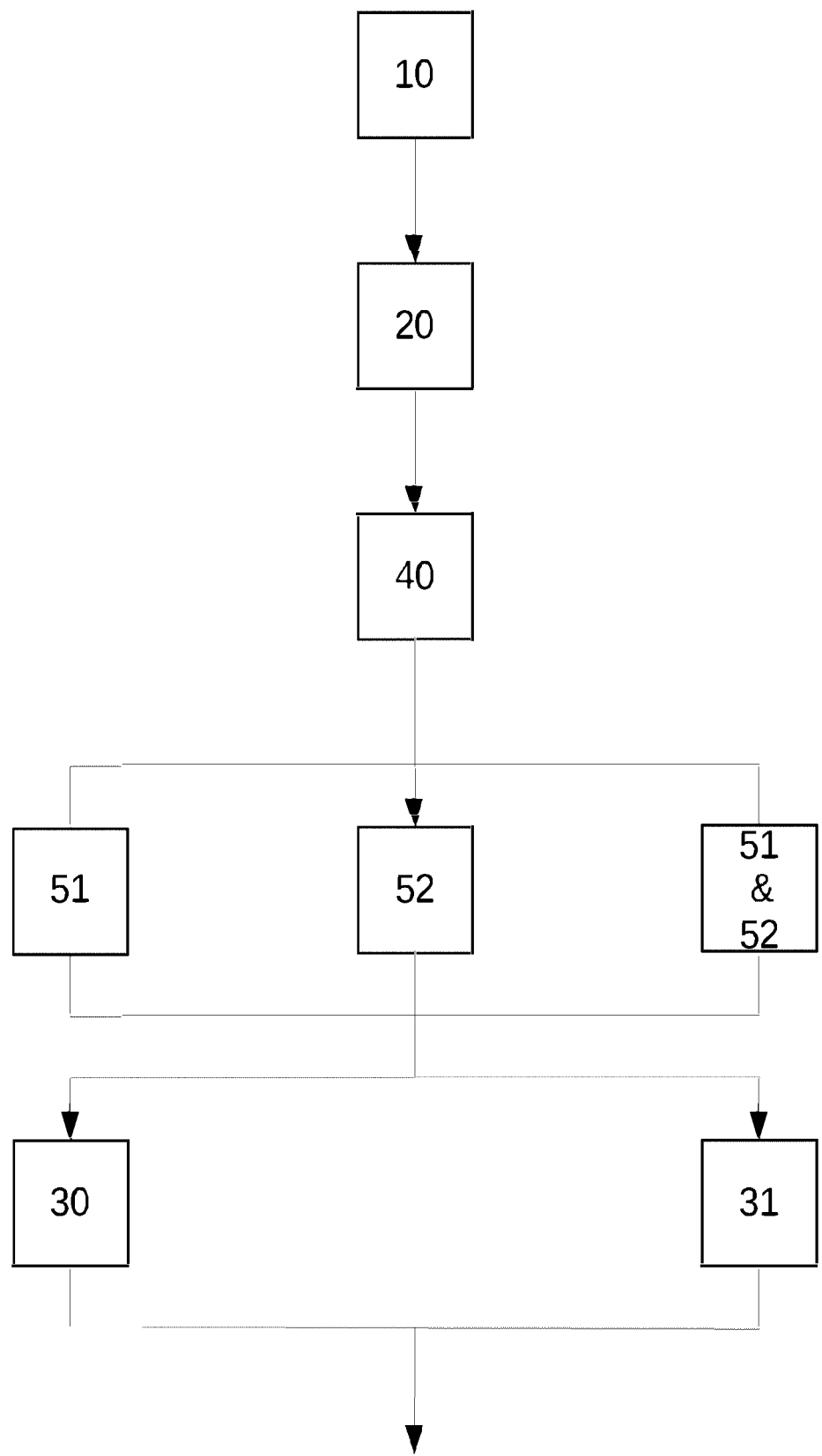
FIG. 4: a schematic representation of a process of recycling a transfer product

FIG. 4 shows a further schematic representation of a process for recycling a transfer product, wherein several possibilities are illustrated here for how such a process can be composed. Such a recycling process, as shown in FIG. 4, is used in particular if the transfer ply of the transfer product has previously been transferred to a substrate to be decorated using a transfer process and/or laminating process and/or insert-molding process and/or in-mold decoration process. Through this recycling process, plastic that is as clean or pure as possible, which can serve for example as a basis for a new carrier film and/or other plastic products, is preferably recovered.

Preferably, as shown in FIGS. 1 to 3, a shredding 10 is effected first, followed by a mechanical cleaning 20 by machine. After the mechanical cleaning 20 by machine, a cleaning 40 of the transfer product shreds with washing liquid by means of at least one cleaning device or combinations of cleaning devices, selected from: washer, hot washer, friction washer, wet cutting device, and/or wet cutting mill, is in particular provided. In this embodiment example, it is also preferably provided that the at least one washing liquid comprises at least one washing liquid or combinations of washing liquids and/or washing substances selected from: water, washing solution, solvent, surfactants, additives, lye/acid, abrasive additives or combinations thereof, with the result that the at least one transfer ply is at least partially removed from the carrier film and further transfer ply constituents result.

In order to extract the moisture resulting from the cleaning 40 with washing liquid from the transfer product shreds, a drying by means of a mechanical dryer 51 and/or drying by means of a thermal dryer 52 is in particular provided. Other drying processes can preferably also be used. It is in particular provided that the drying steps are carried out as often as desired and/or in any desired order. Thus, for example, a drying with a combination of a mechanical dryer 51 and a thermal dryer 52 is also possible.

After the drying 50 of the transfer product shreds, a compressing 30, preferably by means of a plastics compactor, and/or an extrusion 31 of the transfer product shreds, in particular carrier film shreds, preferably by means of an extruder system, into an extrusion product is preferably effected.

Figure 5:
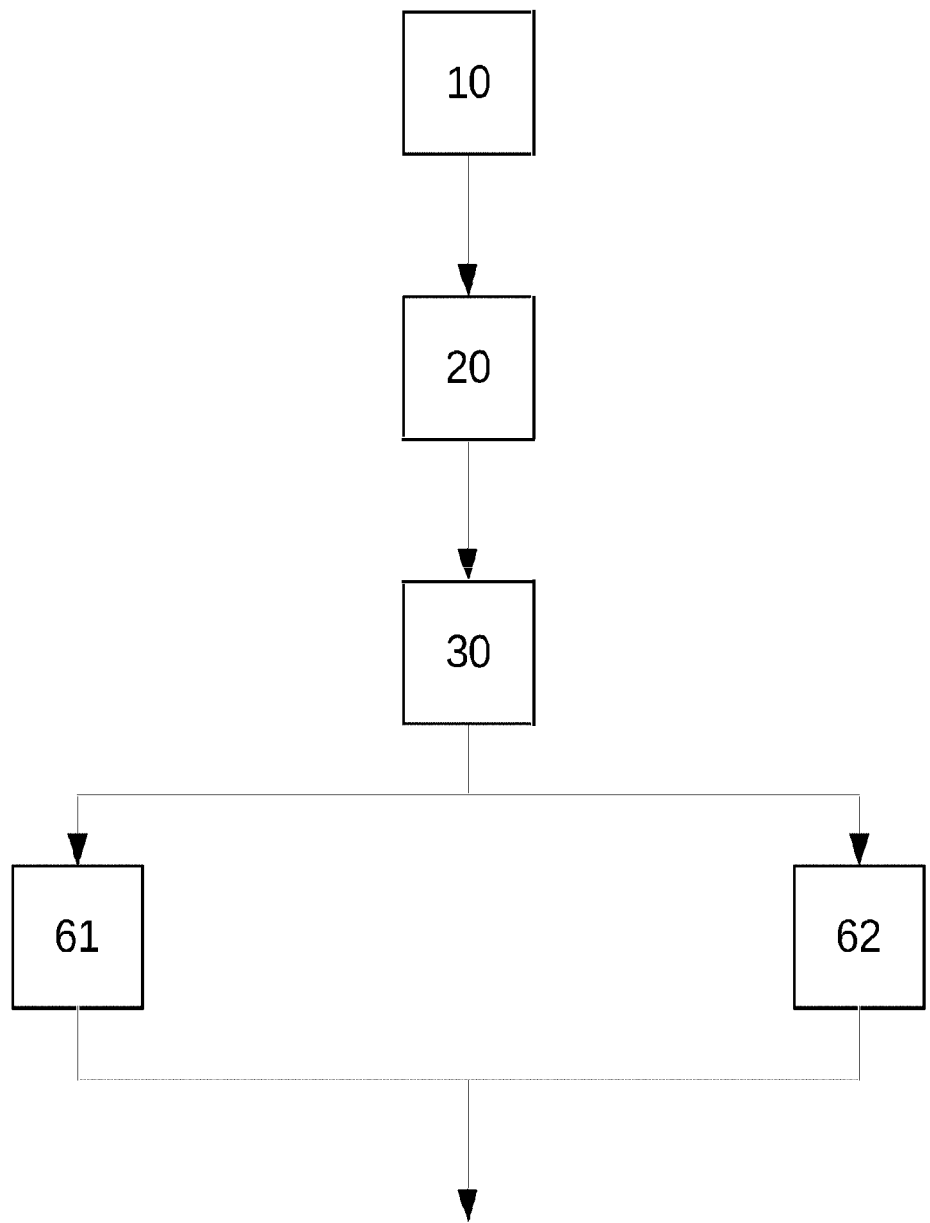
FIG. 5: a schematic representation of a process of recycling a transfer product

FIG. 5 likewise shows a schematic representation of a process for recycling a transfer product, wherein further embodiment variants are presented. The recycling process shown in FIG. 5 is suitable in particular for highly contaminated transfer products, in particular contaminated with transfer layers. In particular, this recycling process is provided for transfer products which have been declared to be rejects. Such transfer products, as mentioned at the start, have a high transfer ply proportion. It is also possible for this recycling process to be used to process transfer products the transfer ply of which has previously been transferred to a substrate to be decorated by means of transfer processes and/or laminating processes and/or insert-molding processes and/or in-mold decoration processes, but the transfer product is primarily a transfer product which cannot be cleaned with washing liquid. Such transfer products can in particular contain crosslinked varnishes or varnishes that are difficult to detach. By crosslinked varnishes or varnishes that are difficult to detach is meant layers which are irreversibly joined to the carrier film. These are preferably polymeric detachment layers, which have a detachment behavior better than and/or different from conventional carrier films. Such detachment layers are irreversibly joined to the carrier film and a transfer ply is arranged on the detachment layer. The transfer ply can in particular be more easily detached from the carrier film with a polymeric detachment layer, with the result that a higher-quality decoration of a substrate to be decorated is made possible. The recycling process presented in FIG. 5 is suitable in particular for recycling highly contaminated transfer products, in order to make these further processable in as uncomplicated a manner as possible.

It is preferably provided that the steps known from FIG. 1 of shredding 10, mechanically cleaning 20 by machine and compressing 30 are carried out first. In this embodiment example, a compounding with processing in an offline process 61 and/or a compounding with processing in an inline process 62 is effected after the compressing 30.

During the compounding with processing in an offline process 61, in particular in step f), the molten compound is preferably further processed into a granular material by means of strand granulation and/or underwater granulation. It is possible for the resulting granular material to be further processed then in further process steps into a further carrier film and/or other plastic products, for example by means of injection molding and/or pressing methods and/or extrusion.

During the compounding with processing in an inline process 62, in particular in step f), the molten compound is preferably further processed directly in a shaping process, in particular an injection-molding process and/or pressing process and/or extrusion process.

LIST OF REFERENCE NUMBERS 10 shredding
20 mechanical cleaning by machine
30 compressing
31 extruding
40 cleaning with washing liquid
50 drying
51 drying by means of a mechanical dryer
52 drying by means of a thermal dryer
60 compounding
61 compounding and processing in an offline process
62 compounding and processing in an inline process

The invention claimed is:
1. A method for recycling a transfer product having at least one carrier film, wherein a transfer ply is arranged detachably at least partially on the at least one carrier film, and wherein the following steps are carried out in the method:
   a) shredding the transfer product, by means of a shredder or a shredding device, into transfer product shreds;

b) mechanically cleaning the transfer product shreds, by machine, in order to remove foreign materials and/or transfer ply constituents; and
c) compressing the transfer product shreds into a compact product,
wherein, in step a), during the shredding of the transfer product, the at least one transfer ply is at least partially removed from the at least one carrier film, and thus a mixture of transfer product shreds and/or carrier film shreds and/or transfer ply constituents results.

2. The method according to claim 1, wherein the transfer product shreds comprise transfer ply constituents and/or carrier film shreds.

3. The method according to claim 1, wherein the transfer ply constituents comprise varnish residues and/or varnish dusts and/or fine material.

4. The method according to claim 1, wherein the at least one carrier film comprises PET as main constituent, wherein the proportion of PET in the carrier film is more than 97%.

5. The method according to claim 1, wherein the at least one transfer ply, has at least one layer or a combination of layers, selected from: adhesive layer, detachment layer, decorative layer, metal layer, adhesion-promoting layer, primer layer, color layer.

6. The method according to claim 1, wherein the following step is further performed before step a):
winding the transfer product, with the result that a roll is provided.

7. The method according to claim 1, wherein the following step is further performed before step a):
collecting the transfer product by means of a collection vessel.

8. The method according to claim 1, wherein the following step is further performed before step a):
transporting the roll and/or the collection vessel to the shredder or the shredding device by hand and/or by means of a feeder.

9. The method according to claim 1, wherein, before step a), the transfer product has a foreign material proportion in the range of from 0 wt.-% to 5 wt.-%.

10. The method according to claim 1, wherein, before step a), the transfer product has a proportion of adhesive strips and/or splicing tapes in the range of from 0 wt.-% to 0.5 wt.-%.

11. The method according to claim 1, wherein the shredder and/or the shredding device cuts and/or chops and/or shreds and/or tears the transfer product in step a).

12. The method according to claim 1, wherein the mechanical cleaning by machine in step b) is effected by means of friction, wherein the transfer product shreds are present in the dry state and further transfer ply constituents are removed.

13. The method according to claim 1, wherein the transfer product shreds after step b) have a varnish residue proportion in the range of from 0 wt.-% to 100 wt.-%.

14. The method according to claim 1, wherein, in step c), the compressing is effected by means of agglomerating.

15. The method according to claim 1, wherein, during the compressing in step c), the transfer product shreds, are compacted and/or compressed, in order to provide a compact product with a higher bulk density, than the bulk density of the transfer product shreds.

16. The method according to claim 1, wherein the following step is further performed after the compressing in step c):
Liquid State Polymerization and/or Solid State Polymerization to improve the material properties.

17. The method according to claim 1, wherein, in step c), the temperature during the compressing of the transfer product shreds is in a range of from 25° C. to 150° C.

18. The method according to claim 1, wherein, after step c), the compact product has a purity in the range of from 60.0 wt.-% to 100.0 wt.-%.

19. The method according to claim 1, wherein, after step c), the compact product has an intrinsic viscosity in the range of from 0.3 dl/g to 0.9 dl/g.

20. The method according to claim 1, wherein, after step c), the compact product is colorless, transparent, crystal clear, opaque, dyed, at least partially dyed or colored.

21. The method according to claim 1, wherein, after step c), the compact product is suitable for at least one subsequent process or a combination of processes, selected from: injection molding, extrusion, pressing processes, compounding, chemical recycling and/or energy recovery.

22. The method according to claim 1, wherein the following step is further performed after step b):
d) cleaning the transfer product shreds with washing liquid by means of at least one cleaning device or a combination of cleaning devices, selected from: washer, hot washer, friction washer, wet cutting device, and/or wet cutting mill with the result that the at least one transfer ply is at least partially removed from the carrier film and further transfer ply constituents result.

23. The method according to claim 22, wherein, in step d), the at least one transfer ply is removed from the carrier film by means of friction.

24. The method according to claim 22, wherein, in step d), the further transfer ply constituents are removed from the washing liquid by means of at least one thermal and/or mechanical separating process.

25. The method according to claim 22, wherein the following step is further performed after step d):
e) drying the transfer product shreds, by means of a mechanical dryer and/or thermal dryer.

26. The method according to claim 25, wherein, after step e), the transfer product shreds have a purity in the range of from 60.0 wt.-% to 100.0 wt.-%.

27. The method according to claim 1, wherein the following step is further performed:
f) compounding the compact product and/or the transfer product shreds, wherein additives are added in order to provide a compound with improved material properties.

28. The method according to claim 27, wherein, in step f), the molten compound is further processed directly in a shaping process.

29. The method according to claim 28, wherein, in step f), when the shaping process is being carried out, the melting temperature for the compound is in a range of from 100° C. to 350° C.

30. The method according to claim 28, wherein, in step f), when the shaping process is being carried out, the melting temperature for the compound is in a range of from 150° C. to 320° C.

31. The method according to claim 27, wherein, in step f), the molten compound is further processed into a granular material by means of strand granulation and/or underwater granulation.

32. The method according to claim 27, wherein, in step f), during the compounding, the melting temperature is in a range of from 100° C. to 350° C.

33. The method according to claim 27, wherein, in step f), during the compounding, the melting temperature is in a range of from 150° C. to 320° C.

34. The method according to claim 27, wherein, in step f), during the compounding, a vacuum and/or negative pressure is generated in the compounder.

35. The method according to claim 27, wherein, after step f), the compound and/or granular material, has a notch toughness, at room temperature, in the range of from 1 kJ/m² to 100 KJ/m².

36. The method according to claim 27, wherein, after step f), the compound and/or granular material, has a modulus of elasticity (E modulus), in the range of from 1,000 MPa to 10,000 MPa.

37. The method according to claim 27, wherein, after step f), the compound and/or granular material has a purity in the range of from 20.0 wt.-% to 99.9 wt.-%.

* * * * *